(12) United States Patent
Steinmetz et al.

(10) Patent No.: US 7,868,122 B2
(45) Date of Patent: Jan. 11, 2011

(54) TINT-VISCOSITY STABILIZATION POLYMERIC THICKENERS

(75) Inventors: Alan L. Steinmetz, Louisville, KY (US); Shakti L. Mukerjee, Louisville, KY (US)

(73) Assignee: Southern Clay Products, Inc., Gonzales, TX (US)

(*) Notice: Subject to any disclaimer, the term of this patent is extended or adjusted under 35 U.S.C. 154(b) by 27 days.

(21) Appl. No.: 12/142,581

(22) Filed: Jun. 19, 2008

(65) Prior Publication Data

US 2009/0318595 A1 Dec. 24, 2009

(51) Int. Cl.
*C08G 18/10* (2006.01)

(52) U.S. Cl. .............. 528/44; 528/59; 528/60; 528/62; 528/86; 524/101; 524/296; 524/297; 524/431; 524/589; 524/590; 524/591; 510/461; 510/475; 510/499; 510/501; 106/31.13; 106/31.01; 106/31.6; 106/31.28; 106/31.77

(58) Field of Classification Search .............. 524/101, 524/296, 297, 431, 589, 590, 591; 528/44, 528/59, 60, 62, 86; 510/461, 475, 499, 501; 106/31.01, 31.13, 31.77, 31.6

See application file for complete search history.

(56) References Cited

U.S. PATENT DOCUMENTS

| | | | |
|---|---|---|---|
| 4,079,028 A | 3/1978 | Emmons et al. | |
| 4,155,892 A | 5/1979 | Emmons et al. | |
| 4,426,485 A | 1/1984 | Hoy et al. | |
| 4,742,090 A | 5/1988 | Hunter et al. | |
| 4,794,147 A | 12/1988 | Savino et al. | |
| 4,946,910 A | 8/1990 | Savino et al. | |
| 5,066,732 A | 11/1991 | Savino et al. | |
| 5,252,654 A | 10/1993 | David et al. | |
| 5,268,397 A | 12/1993 | Larson | |
| 5,270,352 A | 12/1993 | Carpenter et al. | |
| 5,294,692 A | 3/1994 | Barron et al. | |
| 5,326,815 A | 7/1994 | Serdiuk et al. | |
| 5,334,650 A | 8/1994 | Serdiuk et al. | |
| 5,376,709 A | 12/1994 | Lau et al. | |
| 5,378,756 A | 1/1995 | Thies et al. | |
| 5,500,475 A | 3/1996 | Eicken et al. | |
| 5,627,232 A | 5/1997 | Glancy et al. | |
| 5,629,373 A | 5/1997 | Glancy et al. | |
| 5,753,731 A | 5/1998 | Yoshioka et al. | |
| 5,914,373 A | 6/1999 | Glancy et al. | |
| 6,090,876 A | 7/2000 | Link et al. | |
| 6,337,366 B1 | 1/2002 | Amick et al. | |
| 6,353,057 B1 | 3/2002 | Blank et al. | |
| 7,335,699 B2 | 2/2008 | Dziwok et al. | |
| 2004/0102585 A1 | 5/2004 | Steinmetz et al. | |
| 2004/0147662 A1 | 7/2004 | Mattingly | |
| 2006/0205630 A1* | 9/2006 | Blankenship et al. | ........ 510/475 |
| 2007/0082976 A1* | 4/2007 | Bauer et al. | ................. 523/160 |
| 2007/0161745 A1 | 7/2007 | Coutelle et al. | |
| 2009/0209659 A1* | 8/2009 | Di Cosmo et al. | ........ 514/772.3 |

FOREIGN PATENT DOCUMENTS

| | | |
|---|---|---|
| EP | 1806386 | 7/2007 |
| WO | 9406840 | 3/1994 |
| WO | 0112712 | 2/2001 |

OTHER PUBLICATIONS

PCT, Search Report and Written Opinion for International counterpart Application No. PCT/US2009/041658, mailed Jul. 24, 2009, 12 pages.

* cited by examiner

*Primary Examiner*—Peter D Mulcahy
(74) *Attorney, Agent, or Firm*—Meyertons, Hood, Kivlin, Kowert & Goetzel, P.C.; Eric B. Meyertons

(57) ABSTRACT

Compositions and methods of making urethane based nonionic associative thickeners are described herein. Uses of the nonionic associative thickeners are also described.

20 Claims, 5 Drawing Sheets

X=0 to 20; R =alkyl, aryl, aromatic where $R^4$ is hydrogen, alkyl, alkyl ether

X = 0 or 1

TINT-VISCOSITY STABILIZATION POLYMERIC THICKENERS

BACKGROUND

1. Field of the Invention

The present invention relates to thickeners. More particularly, the invention relates to methods of making nonionic associative thickeners and compositions thereof.

2. Brief Description of the Related Art

Additives may be used to enhance and/or maintain the viscosity of aqueous systems. For example, additives may be used to increase or maintain the viscosity for compositions used in applications including, but not limited to, latex paint, cleaning agents, cosmetics, aqueous pigment pastes, automotive finishes, industrial coatings, printing inks, lubricating greases, textile coatings, pharmaceutical preparations, agricultural formulations, filler dispersion, adhesives, detergents, wax dispersions, drilling fluids, fire-fighting foams, and/or polishes. Such additives are commonly referred to as "thickeners". Thickeners may improve and/or affect other properties in certain aqueous systems. For example, thickeners used in latex paints may improve and control the viscosity of the paint, protect colloidal action, and improve pigment suspension, leveling, and flow. Thickeners for aqueous systems include natural thickeners, modified natural thickeners, and synthetic thickeners. Examples of natural thickeners include alginates, casein, gum karaya, locust bean gum, and gum tragacanth. Modified natural thickeners may include derivatized cellulose compounds such as methyl cellulose, hydroxyethyl cellulose, and hydroxypropylmethyl cellulose. Examples of synthetic thickeners include carboxy vinyl ether copolymers, acrylic polymers, maleic anhydride styrene copolymers, and polyurethanes.

Synthetic thickeners are described in U.S. Pat. No. 4,079,028 to Emmons et al.; U.S. Pat. No. 5,252,654 to David et al.; U.S. Pat. No. 5,376,709 to Lau et al.; U.S. Pat. No. 5,627,232 to Glancy et al.; U.S. Pat. No. 5,629,373 to Glancy et al.; U.S. Pat. No. 5,753,731 to Yoshioka et al.; U.S. Pat. No. 5,914,373 to Glancy et al.; and U.S. Published Patent Application Nos. 2007-0161745 to Coutelle and 2004-0147662 to Mattingly; and International Publication No. WO 01/12712 to Zody, all of which are incorporated herein by reference.

Although thickeners for aqueous systems have been used to thicken waterborne compositions, improved thickeners for use in waterborne compositions that include high amounts of pigments and/or intensely colored pigments are needed.

SUMMARY

Embodiments described herein generally relate to methods of making associative thickeners for thickening of waterborne compositions.

In some embodiments, a nonionic associative thickener may have a formula of:

$$R-(OCH_2CH_2)_n-\left[\overset{O}{\underset{H}{O C N X N C}}\overset{O}{\underset{H}{\|}}-(OCH_2CH_2)_p\right]_m-\overset{O}{\underset{H}{O C N X N C}}\overset{O}{\underset{H}{\|}}-(OCH_2CH_2)_n-OR$$

where R is an aromatic hydrophobe; m is $\geq 2$; n is $\geq 1$; p ranges from about 45 to about 275; and each X is independently

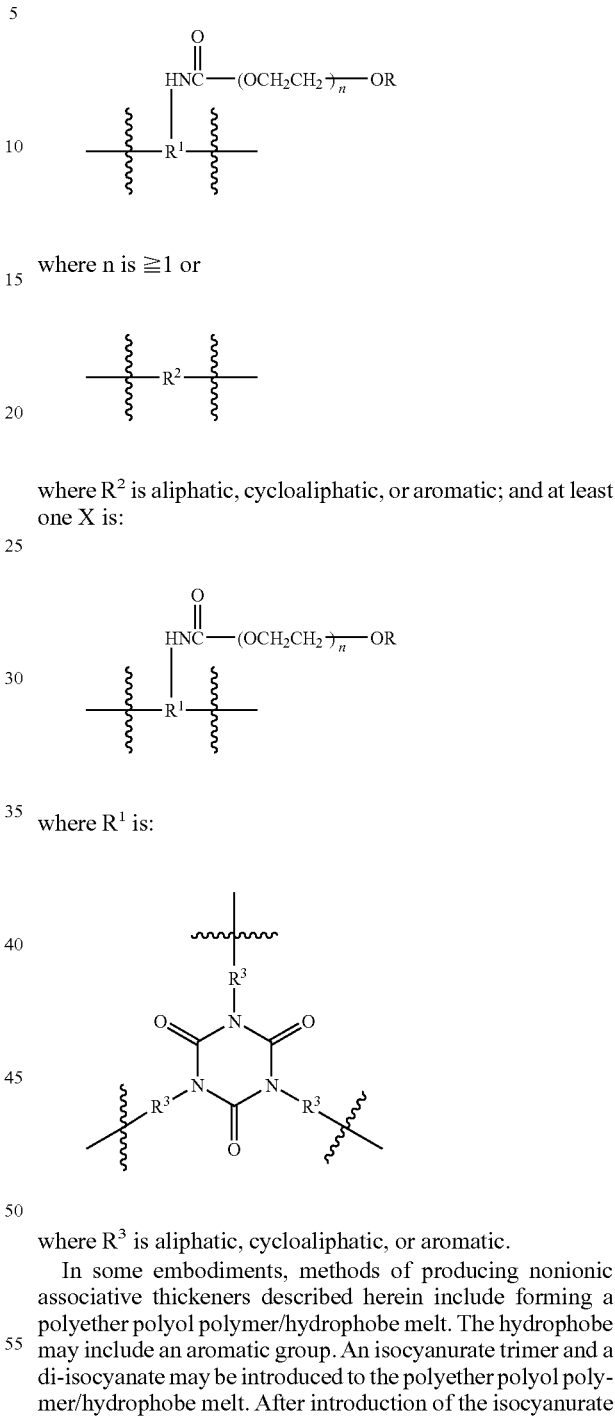

where R$^3$ is aliphatic, cycloaliphatic, or aromatic.

In some embodiments, methods of producing nonionic associative thickeners described herein include forming a polyether polyol polymer/hydrophobe melt. The hydrophobe may include an aromatic group. An isocyanurate trimer and a di-isocyanate may be introduced to the polyether polyol polymer/hydrophobe melt. After introduction of the isocyanurate trimer and di-isocyanate compositions, the polyether polyol polymer/hydrophobe melt may be heated at a temperature sufficient to produce the nonionic associative thickeners described herein.

In some embodiments, waterborne compositions may include nonionic associate thickeners described herein. The waterborne compositions may include water and/or one or more pigment compositions. In some embodiments, the waterborne composition is paint.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
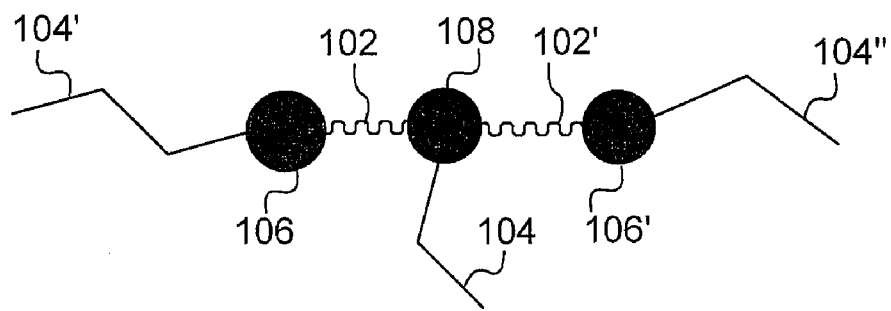
FIG. 1 depicts a schematic representation of an embodiment of an associative thickener having a 2:1 ratio of di-isocyanate to isocyanurate trimer.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

Methods for making and using nonionic associative thickeners are described herein. Compositions of nonionic associative thickeners and compositions containing nonionic associative thickeners are described herein. Selected terms used herein are listed below.

"Acrylic polymer" refers to a polymer wherein at least 0.5 grams of polymer is an acrylic acid residue, a methacrylic acid residue, an acrylic ester residue, a methacrylic ester residue, or mixtures thereof, per gram of polymer.

"Associative thickener" refers to any hydrophobically modified water-soluble polymer capable of interacting in aqueous solution with itself and with another species. The inclusion of hydrophobic modification enhances the ability of a water-soluble polymer to thicken water or to interact with other hydrophobic species and surfaces. These other hydrophobic species include, but are not limited to, the hydrophobe of a surfactant, the surface of a latex particle, the hydrophobic surface of pigments, or any other component of a waterborne coating composition.

"BET surface area" refers to the Brunauer, Emmett, and Teller (BET) method of determining physical adsorption of nitrogen molecules on a solid surface. ASTM Method D 6556 may be used to measure BET surface area.

"Brookfield viscosity" refers to a low shear measurement reported in centipoise at 0.5 rpm on a Brookfield RVT viscometer. Brookfield viscosities are determined according to ASTM Method D 2196.

"Coating composition" refers to a composition that may include one or more pigments. Examples of coating compositions include, but are not limited to, oil-based compositions, water-based composition and/or organic-based compositions.

"Gloss" refers to a sheen or lust imparted by paint. Gloss is determined according to ASTM D 523.

"Hydrophobic" refers to a compound or a portion of a compound that lacks affinity for water.

"Hydrophilic" refers to a compound or a portion of a compound that has affinity for water.

"Level" refers to the ability of a coating composition to cover irregularities. Level is determined according to ASTM Method D 4062.

"Pigment" refers to one or more compounds used to impart color to a substance.

"Pigment composition" refers to a composition that includes one or more pigment compounds and a carrier.

"SAG" refers to flow resistance of a coating composition. A Leneta anti-sag bar is used to apply paint to a black and white Leneta chart. The bar deposits strips of paint from 30 to 12 mils thick approximately 0.5 inches (1.3 cm) wide. The chart is immediately lifted to a vertical position with the 12 mil thick strip at the bottom. Evaluation is based upon how much the strips flow into the strips below. SAG is determined according to ASTM Method D 4400.

"Stormer viscosity" refers to a viscosity measurement in Krebs Units on a Stormer viscometer. Stormer viscosities are determined according to ASTM Method D 562.

"Thickener" refers to one or more compounds that when added to an aqueous solution increase and/or maintain the viscosity of the aqueous solution as compared to the viscosity of the aqueous solution prior to addition of one or more of the compounds.

"Vinyl acetate polymer" refers to any polymer containing at least 0.5 grams of vinyl acetate per gram of polymer.

"Waterborne coating compositions" refer to coatings that contain water as the major volatile component and utilize water to dilute the coating to application consistency. These coatings include, but are not limited to, resinous binder, pigments, water, and organic solvent, or mixtures thereof. Examples of waterborne coating compositions include, but not limited to, latex paint, architectural paints, metal coatings for automotive finishes, coatings, synthetic plaster, adhesives, sealants, and inks.

Waterborne coating compositions (e.g., latex paint and/or latex coatings) are generally tinted using one or more pigments and/or one or more pigment compositions. Pigments are generally inorganic or organic compounds that are insoluble in water. Thus, suspension of the pigment in the base composition (e.g., water) is desired.

Pigments have a variety of particle sizes. For a fixed quantity or weight of pigment, as the pigment particle is divided into smaller and smaller particle sizes, the smaller particle sizes create a larger total surface area. For example, dividing a single cubic pigment crystal into 27 cubes of only ⅓ width increases the surface area of the pigment by 3 times. In general, a pigment surface area increases X times if the average pigment particle size is reduced by 1/X.

Smaller particle size in a coating composition may affect characteristics of the paint. Examples of paint characteristics include, but are not limited to, tint strength, transparency, staining, or combinations thereof. Tint strength of a coating composition may be enhanced when pigments having small particle sizes are used. A pigment having a small particle size may produce more intense color in the same volume of water relative to a pigment having a large particle size because the small particle pigment has a greater surface area in the same weight of pigment as the larger particle size pigment. Small pigment particles may allow coating compositions to become more transparent because the particles become so small that they no longer scatter light. Small pigment particles may be more effective in a staining process because the small pigment particles penetrate spaces between surface compositions (e.g., fibers) more easily compared to pigments having a larger particle size.

Pigments may have a wide range of BET surface areas, as measured by nitrogen adsorption. In some embodiments, the pigment has a surface area of from about $10\,m^2/g$ to $600\,m^2/g$, from about $20\,m^2/g$ to $250\,m^2/g$, or from about $30\,m^2/g$ to $100\,m^2g$.

Pigments with relatively small particles size, thus having a relatively large surface area, may require more base composition to solvate or "wet" all sides of the pigment particles than pigments of larger particle size. For example, the same weight of pigment mixed in the same weight of water produces a thicker paste as the pigment particles get smaller. Thus, the pigment particle size may result in variations in pigment load in coating compositions made with different kinds of pigment. Pigment particle size may also account for the tendency of some pigments to sink in water (because of large particle size), and of other pigments to diffuse or spread out in water and to agglomerate as water dries.

In some embodiments, pigment particles may clump or flocculate into aggregates (clusters of particles) or agglomerates (clumps of aggregates) when combined with a base solution. Clumping may be controlled by manufacturing methods and chemical additives. Large clumps may be reduced by the paint manufacturer during milling (mixing) of pigment and base compositions.

A change in particle size of the pigment particles and/or a change in an amount of pigment and/or a change in the amount of pigment composition may change the viscosity of the coating composition. The viscosity change may result through interaction of thickeners in a base composition with the surface area of pigment particles. Such interaction may solvate the pigment particles. Pigment particle solvation may change the viscosity of the final coating formulation (e.g., reduce the viscosity of a waterborne composition). Commercial pigment concentrates contain high concentrations of surfactants and strong coupling solvents. These amphiphilic materials may interfere with the associative mechanisms by which associative thickeners impart viscosity.

Dark-colored coating compositions generally require high levels of pigment concentrates. Thus the high levels of pigment concentrates contain high levels of amphiphilic materials, thereby interfering with the thickening from the associative thickener of the coating composition. The associative thickeners described herein allow high levels of pigment concentrates to be used in a coating composition at acceptable concentration levels and thickening properties. Thus, dark-colored coating compositions that may not be easily formulated with conventional associated thickeners may now be formulated. In addition, combinations of associative thickeners and/or other thickeners to meet desirable thickening properties of coating composition may not be necessary when associative thickeners described herein are used.

In some embodiments, an amount of pigment or an amount of pigment composition added to a base composition may be varied to achieve light-tones, mid-tones or deep-tones of color. Light-tone (pastel) compositions may include from about 2 ounces (oz) of pigment composition per gallon of coating composition to about 4 oz of pigment composition per gallon of coating composition (from about 59 mL to about 118 mL of pigment composition per 3.78 L of coating composition). Mid-tone compositions may include from about 4 oz to about 8 oz of pigment composition per gallon of coating composition (from about 118 mL to 237 mL of pigment per 3.78 L of coating composition). Deep-tone compositions may include from about 8 oz to at most 16 oz of pigment composition per gallon of coating composition (from about 237 mL to 473 mL of pigment per 3.78 L of coating composition).

One method to compensate for the viscosity reduction of coating compositions that occurs upon increased pigment concentration may include preparation of a base formulation having a very high viscosity. Pigment may be added to the base formulation with the expectation that the viscosity of the pigment will lower the viscosity of the base formulation to adjust the viscosity of the final formulation to an acceptable viscosity for paint. Base formulations having high viscosities, however, may be difficult to manufacture and/or handle by the end user.

Another method that may be used to compensate for the viscosity reduction in paint upon increased pigment concentration may include incorporation of surfactants, cellulosics, alkali-swellable thickeners, and solvents into the base formulation at a concentration sufficient to control the viscosity. Surfactants, cellulosics, alkali-swellable thickeners and solvents may compromise the application properties of the resulting coating. For example, high levels of surfactants or the use of alkali-swellable thickeners may lead to water sensitivity or poor scrub resistance.

In some embodiments, nonionic associative thickeners may be used to compensate for viscosity changes of a coating composition. Nonionic associative thickeners may include a water-soluble hydrophilic portion and one or more hydrophobic groups attached to the hydrophilic portion. Although associative thickeners have been used in the prior art to thicken waterborne compositions, one or more associative thickeners may be necessary to produce a waterborne composition that has an acceptable viscosity after mid-tone or deep-tone pigment compositions are added to the waterborne composition. In preparation of deep-tone waterborne compositions, an amount of pigment composition may be limited to less than 8 ounces per gallon (from about 0.06 mL per L) because of the undesired effect on the viscosity of the final waterborne composition. It has been surprisingly discovered that the associative thickeners described herein provide improved viscosity stability in waterborne compositions that include from about 0.5 ounces to 16 ounces (from about 15 mL to 475 mL), from about 1 ounce to about 12 ounces (from 20 mL to about 355 mL), or from about 2 ounces to about 10 ounces (59 mL to 295 mL) of pigment compositions (e.g., light-tone pigment compositions, mid-tone pigment compositions, or deep-tone pigment compositions, or mixture thereof) per gallon (3.78 L) of waterborne composition.

The viscosity stability of the final waterborne composition may be measured by comparing the Stormer viscosity of the waterborne composition before and after the pigment compositions are added to the waterborne composition. Using the associative thickeners described herein the Stormer viscosity of the waterborne composition after addition of the pigment composition remains within about 70% to 120%, 80% to 110% or 90% to 100% of the Stormer viscosity of the waterborne composition prior to addition of the pigment composition. For example, base compositions that contain an associative thickener described herein may have an initial Stormer viscosity of 101, 85, and/or 90. After addition of 12 ounces (355 mL) of pigment, the Stormer viscosity of the final composition dropped to 79.3, 78.4 and 86.4, respectively. Thus, the Stormer viscosity of the final composition remained within 78%, 92% and 96% of the initial Stormer viscosity of the coating composition after the addition of the pigment composition.

In comparison, using commercially based urethane associative thickeners under the same conditions, the Stormer viscosity of the waterborne composition after addition of the pigment composition is about 60% of the viscosity of the waterborne composition prior to addition of the pigment composition. For example, a base composition that contains a commercially based urethane associative thickener may have an initial Stormer viscosity of 98. After addition of 12 ounces (355 mL) of pigment, the Stormer viscosity of the final composition (i.e., colored paint) dropped to 58. Thus, the Stormer viscosity of the final composition was 59% of the initial Stormer viscosity.

Figure 2:
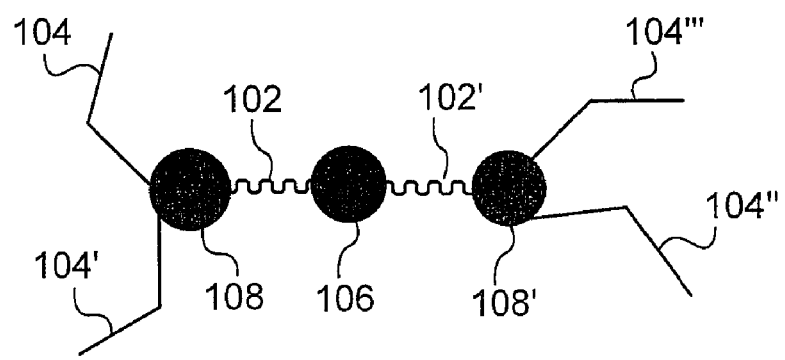
FIG. 2 depicts a schematic representation of an embodiment of an associative thickener having a 2:1 ratio of isocyanurate trimer to di-isocyanate.
Figure 3:
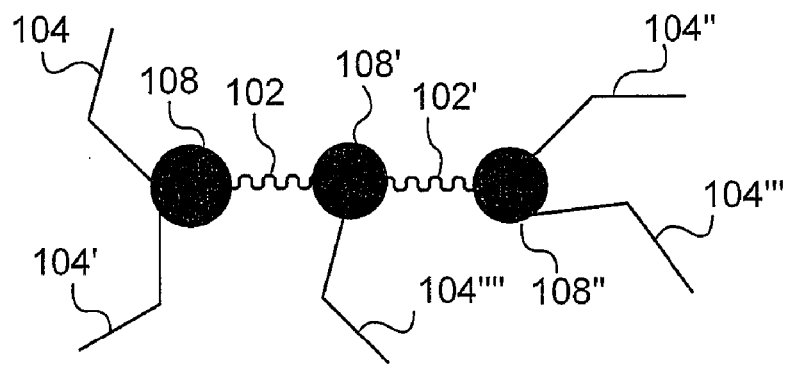
FIG. 3 depicts a schematic representation of an associative thickener having isocyanurate trimer groups.

Associative thickeners generally include one or more hydrophilic portions coupled together with one or more hydrophobic portions. Some embodiments of associative thickeners are depicted in FIGS. 1-3. In each of the figures, one or more hydrophilic portions 102 are linked to one or more hydrophobic portions 104 through one or more coupling portions 106, 108. In some embodiments, coupling portions may be di-functional portion 106 or tri-functional portion 108. Di-functional coupling portion 106 may be coupled to any combination of two hydrophilic portions 102 and/or two hydrophobic portions 104. Tri-functional coupling group 108 may be coupled to any combination of three hydrophilic portions 102 and/or hydrophobic portions 104.

Referring to FIG. 1, an embodiment of as associative thickener is schematically depicted which includes di-functional coupling portions 106, 106' and tri-functional coupling portion 108. Di-functional coupling portion 106 is coupled to hydrophobic portion 104' and hydrophilic portion 102. Di-functional coupling portions 106' is coupled to hydrophobic portion 104" and hydrophilic portion 102'. Tri-functional coupling portion 108 is coupled to hydrophobic portion 104 and hydrophilic portions 102, 102'.

Referring to FIG. 2, an embodiment of an associative thickener is schematically depicted which includes tri-functional coupling portions 108, 108' and di-functional coupling portion 106. Di-functional coupling portion 106 is coupled to hydrophilic portions 102, 102'. Tri-functional coupling portion 108 is coupled to hydrophobic portions 104, 104' and hydrophilic portion 102. Tri-functional coupling portion 108' is coupled to hydrophobic portions 104', 104", 104''' and hydrophilic portion 102'.

Referring to FIG. 3, an embodiment of an associative thickener is schematically depicted which includes three tri-functional coupling portions. Tri-functional coupling portion 108 is coupled to hydrophobic portions 104, 104', and hydrophilic portion 102. Tri-functional coupling portion 108" is coupled to hydrophobic portions 104", 104''' and hydrophilic portion 102'. Central tri-functional coupling portion 108' is coupled to hydrophilic portions 102, 102' and hydrophobic portion 104''''.

While schematically the hydrophilic portions and hydrophobic portions appear somewhat identical, it should be understood that it is not required that each hydrophobic and each hydrophilic portion be identical. In some embodiments, some or all of the hydrophobic portions and hydrophilic portions are different. In certain embodiments, all of the hydrophobic portions may be identical and all of the hydrophilic portions may be identical. The same holds true with regard to the coupling portions. When multiple coupling di-functional or tri-functional coupling portions are present, the coupling portions may be identical or may be different.

Figure 4:
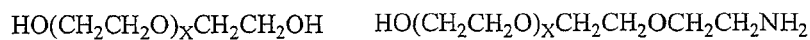
FIG. 4 depicts various hydrophilic portions of embodiments of associative thickener.
Figure 4:
Figure 4:
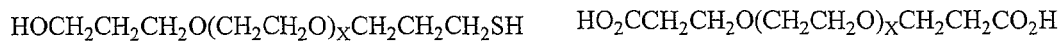
Figure 4:
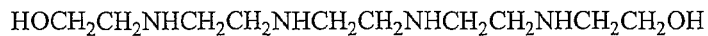
Figure 4:
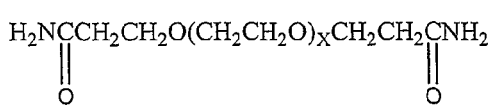
Figure 4:
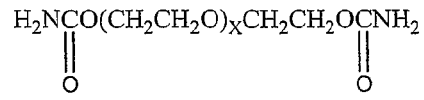
Figure 4:
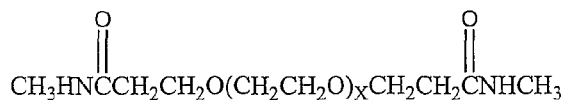
Figure 4:
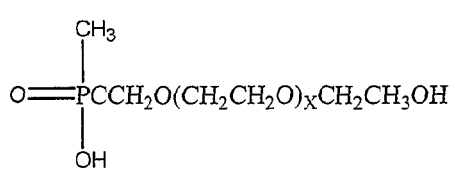
Figure 4:
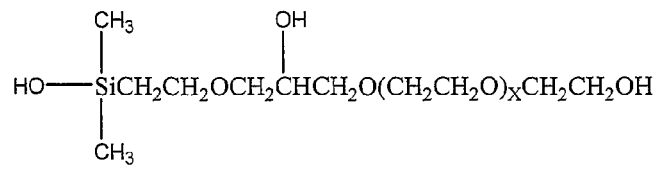
Figure 4:
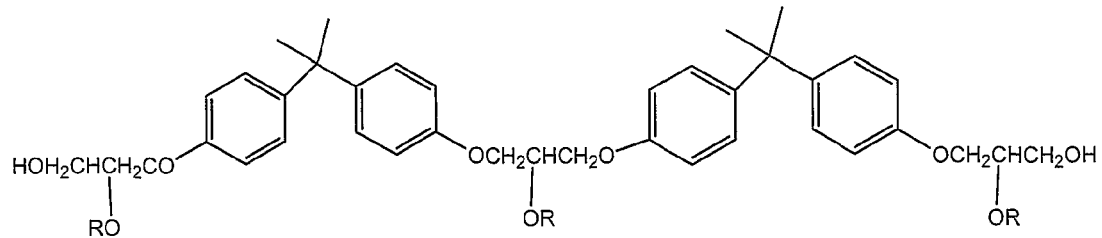
Figure 4:
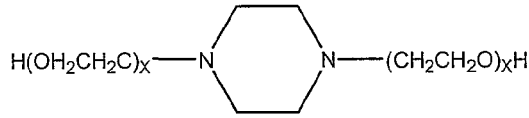
Figure 4:
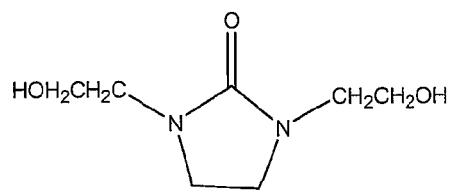
Figure 4:
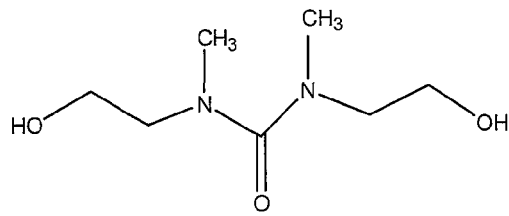

The hydrophilic portions of an associative thickener are generally di-functional to allow coupling to two different coupling portions. Examples of compounds that may be used as hydrophilic portions of an associative thickener are shown in FIG. 4.

In other embodiments, a hydrophilic portion of an associative thickener includes, but is not limited to, a polymer chain. Examples of hydrophilic polymer chains that may be used include, but are not limited to, polyalkylene oxides, cellulose derivatives, acrylate chains, polyether chains, or polyester chains.

In some embodiments, the hydrophilic portion of an associative thickener is a polyether (also known as a polyether polyol). Polyethers may be adducts of an aliphatic, cycloaliphatic or aromatic polyhydroxy compound with an alkylene oxide. Polyhydroxy compounds include, but are not limited to, polyhydric alcohols or polyhydric alcohol ethers. Alkylene oxide compounds include, but are not limited to, ethylene oxide and/or propylene oxide. Polyhydric alcohols include, but are not limited to, glycols, polyalkylene glycols, hydroxy compounds containing three or more hydroxyl groups, polyhydroxyalkanes, or mixtures thereof. Glycols include, but are not limited to, ethylene glycol and/or propylene glycol. Hydroxy compounds containing three or more hydroxyl groups include, but are not limited to, polyalkylolalkanes, trimethylol propane, and/or pentaerythritol. Polyhydroxyalkanes include, but are not limited to, glycerol, erythritol, sorbitol, mannitol, or mixtures thereof. Polyalkylene glycols include, but are not limited to, polyethylene glycol, polypropylene glycol, polybutylene glycol, or mixtures thereof. Polyalkylene glycols may have a molecular weight between about 4,000 and 35,000. Polyalkylene glycols are commercially available under the tradenames Carbowax™ (Dow Chemical Company (Midland, Mich.)) and Pluronic® (BASF, Germany). Cycloaliphatic polyhydric alcohols include, but are not limited to, cyclopentandiol-1,2,1,4-cyclohexandiol and/or hexahydroxycyclohexane. Aromatic polyhydric alcohols may include, but are not limited to, di-hydroxybenzene and trihydroxybenzene.

In certain embodiments, adducts of an alkylene oxide and a monofunctional reactant such as a fatty alcohol, a phenol or an amine may be used as a hydrophilic portion. Adducts of an alkylene oxide and a difunctional reactant such as an alkanolamine (e.g., ethanolamine) may also be used as the hydrophilic portion. These adducts are also known as diol ethers and alkanolamine ethers, respectively. Examples of aminoterminated polyoxyethylenes are Jeffamines® manufactured by Huntsman Chemical Company (The Woodlands, TX).

In some embodiments, the hydrophilic portion of the associative thickener is represented by the formula:

$$X_1\text{---}[CH_2CH_2Z]_m\text{-}CH_2CHR\text{---}X_2$$

where Z is O, NH, or S; R is hydrogen, alkyl, or alkoxy; $X_1$ and $X_2$ are H, OH, $NH_2$, secondary amines, sulfidyl, carboxy, carbozmido, silyl, phosphoryl, uredio or combinations thereof; and m is 0 to 20.

The hydrophilic portion of the associative thickener may be bonded to one or more coupling portions. Coupling portions may include two or more isocyanate groups (i.e., polyisocyanates). The coupling portions may be aliphatic, cycloaliphatic, and/or aromatic isocyanates. Examples of polyisocyanates that may be used as coupling portions include, but are not limited to: 1,4-tetramethylene di-isocyanate; 1,6-hexamethylene di-isocyanate (HDI); 2,2,4-trimethyl-1,6-di-isocyanatohexane; 1,10-decamethylene di-isocyanate; 1,4-cyclohexylene di-isocyanate; 4,4'-methylenebis (isocyanatocyclohexane); 1-isocyanato-3-isocyanatomethyl-3,5,5-trimethylcyclohexane; m- and p-phenylene di-isocyanate; 2,6- and 2,4-toluene di-isocyanate (TDI); xylene di-isocyanate; 4-chloro-1,3-phenylene di-isocyanate; 4,4'-biphenylene di-isocyanate; 4,4'-methylene diphenylisocyalnate ("MDI"); 1,5-naphthylene di-isocyanate; 1,5-tetrahydronaphthylene di-isocyanate; polymethylene polyphenylisocyanates; isophorone di-isocyanate (IPDI, Vestanat® Evonik Industries, Germany); aromatic isocyanurate trimer adduct of trimethylol propane and toluene di-isocyanate; aliphatic isocyanurate trimer product of the hydrolytic trimerization of 1,6-hexamethylene di-isocyanate (Desmodur® N, Bayer MaterialScience LLC, Pittsburgh, Pa., USA); or 1-methyl-3,3, di-methyl cyclohexyl tri-isocyanurate.

The isocyanates may contain any number of carbon atoms effective to provide the required degree of hydrophobic character. In some embodiments, the number of carbon atoms ranges from 4 to 30 atoms, from 10 to 25, or from 15 to 20. The number of carbon atoms may be selected based upon on the proportion of the other hydrophobic groups and hydrophilic group in the product.

In some embodiments, polyisocyanates also include any polyfunctional isocyanate derived from the reaction of any polyisocyanate and an active hydrogen compound having a functionality of at least two such that at least one isocyanate group remains unreacted. Such isocyanates are equivalent to chain-extending an isocyanate terminated isocyanate/diol reaction product with a reactant containing at least two active hydrogen atoms in a manner well known in polyurethane synthesis.

An amount of isocyanates may be proportional to the amount of hydrophilic compound in the associative thickener. For example, a 3:2 ratio of an isocyanate compound to a hydrophilic compound may require 3 parts of the isocyanate compound to 2 parts of the hydrophilic compound. The number of isocyanates and hydrophilic compounds may be chosen to provide an associative thickener of a desired molecular weight.

In some embodiments, the one or more coupling portions of the associative thickener are bonded to one or more hydrophobic portions. Hydrophobic portions of a nonionic associative thickener may contact and/or coat the surface of dispersant or binders in the application system. For example, the hydrophobic portion may coat a surface of a filler used in a paint. Having multiple hydrophobic groups may enhance thickening performance of the associative thickener in waterborne coatings.

Figure 5:
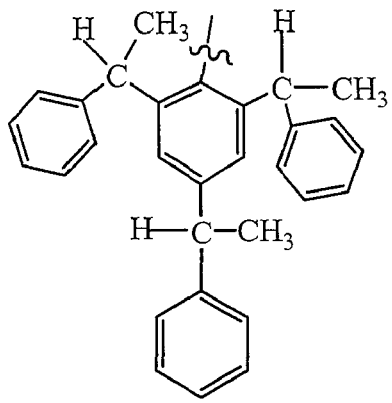
FIG. 5 depicts various hydrophobic portions of embodiments of associative thickeners.
Figure 5:
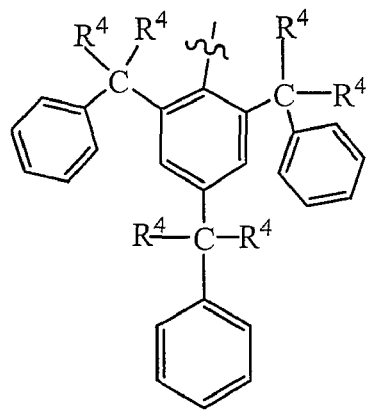
Figure 5:
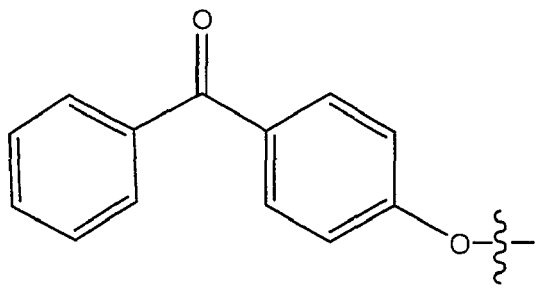
Figure 5:
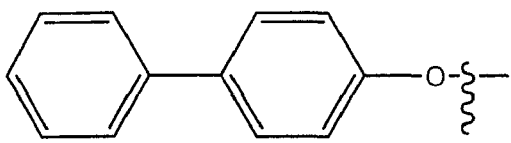
Figure 5:
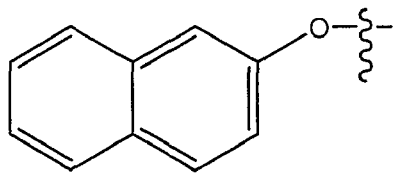
Figure 5:
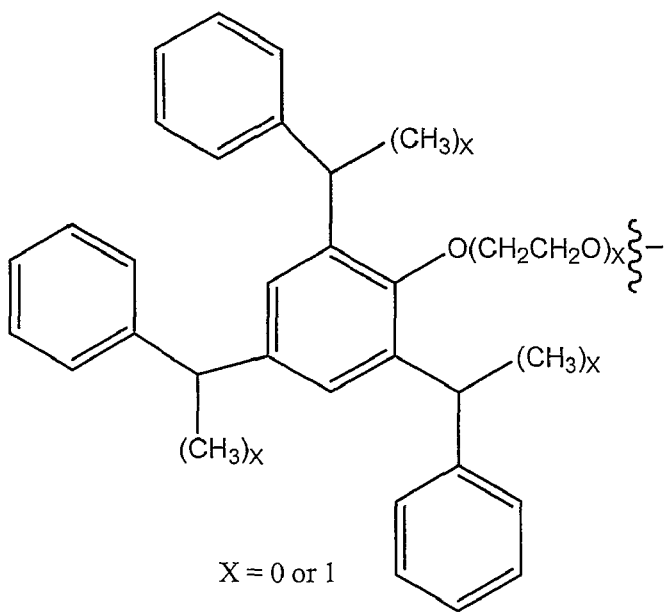

In certain embodiments, the hydrophobic portion of the associative thickener may be any group suitable for enhancing the performance of the associative thickener. Examples of compounds that may be used for hydrophobic portions of an associative thickener are shown in FIG. 5. In some embodiments, the associative thickener may include hydrophobes bonded to an isocyanate through an oxygen linkage. The hydrophobic group may be derived, for example, from alcohols, thiols, carboxylic acids, carboxamides, and carbamates.

In some embodiments, the hydrophobic group is derived from alcohols having a carbon number ranging from 1 to 24, from 5 to 20, or from 10 to 25. Examples of such alcohols are methanol, ethanol, octane, dodecanol, tetradecanol, hexadecanol, cyclohexanol, phenol, cresol, octylphenol, nonyl phenol, dodecyl phenol, tristyrylphenol, ethoxylated tristyrylphenol, monomethyl ethers of ethylene glycol, monoethyl ethers of ethylene glycol, monobutyl ethers of ethylene glycol, monomethyl ethers of ethylene diethylene glycol, monoethyl ethers of diethylene glycol, monobutyl ethers of diethylene glycol, alkyl and alkaryl polyether alcohols such as straight or branched alkanol/ethylene oxide and alkyl phenol/ethylene oxide adducts (e.g., lauryl alcohol, t-octylphenol or nonylphenolethylene oxide adducts containing 1-250 ethylene oxide groups); and other alkyl, aryl and alkaryl hydroxyl compounds, or combinations thereof.

In some embodiments, from about 0.01 grams to about 0.15 grams, 0.02 grams to about 0.1 grams, or from about 0.03 grams to about 0.08 grams of hydrophobic compound per gram of associative thickener may be used. In some embodiments, the amount of di-isocyanate or isocyanurate trimer groups determines the amount of hydrophobic compounds used. For example, an associative thickener that includes two isocyanurate trimer compounds and one di-isocyanate compound may require at least four hydrophobic compounds to cap the unreacted isocyanate groups.

In some embodiments, the hydrophobic portion of the associative thickener includes amino groups. Amino groups may include, but are not limited to, primary aliphatic amines, secondary aliphatic amines, cycloaliphatic amines, aromatic amines, or mixtures thereof. Examples of amines include, but are not limited to, tert-alkyl amines (e.g., tert-octyl amine and n-dodecyl amines), secondary amines, and primary amines (e.g., n-octyl amine). The amine groups may contain more than one active hydrogen atom provided that under normal reaction conditions it is only monofunctional towards an isocyanate group. A primary amine is an example of such a compound.

In some embodiments, the hydrophobic portion may be selected to produce associative thickeners that have high shear viscosity characteristics, resistance to spatter, and gloss retention in waterborne coating compositions that include high surface area pigments. The hydrophobic portion may include alkyl groups, aromatic groups, alcohols, thiols, carboxylic acid carboxamides, carbamates, or combinations thereof. In some embodiments, the hydrophobic portion includes sterically hindered groups. For example, one or more aromatics groups bonded to a benzene ring. Hydrophobic portions that are sterically hindered may allow dispersment of pigments that have a small particle size. For example, pigments having a surface area of at least 10 $m^2/g$ may be dispersed.

Use of sterically hindered hydrophobic portions in an associative thickener may allow one compound to be used as the associative thickener in a waterborne coating composition instead of multiple thickeners. Reduction in the number of thickeners used in a waterborne coating composition may allow waterborne coating compositions to be prepared in a more efficient manner by distributors of commercial and/or residential waterborne coatings.

In some embodiments, the hydrophobic portion has the formula:

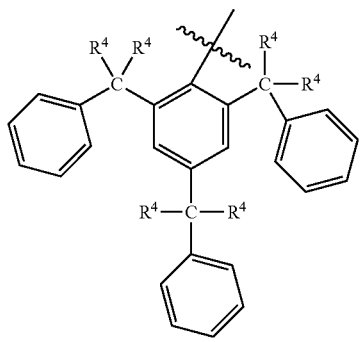

where $R^4$ is hydrogen, alkyl group, butyl, phenyl, benzyl, or combinations thereof. Associative thickeners prepared with one of more of the above hydrophobic portions may allow waterborne coating compositions having dark pigments to have better high shear viscosity characteristics, resistance to spatter, and gloss retention as compared to commercially available waterborne coating compositions.

In some embodiments, the associative thickener may include one or more di-isocyanate groups and/or isocyanurate trimer groups as coupling portions. The isocyanate groups may be linked with one or more hydrophilic portions described herein. The isocyanate group may include one or more unreacted isocyanates which are capable of bonding with one or more hydrophobic portions described herein. In some embodiments, the associative thickener has the formula:

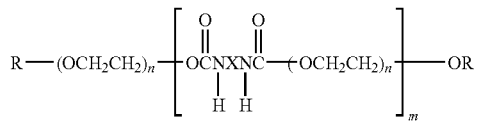

where R is an aromatic hydrophobic portion; m is $\geqq 2$; n is $\geqq 1$; and each X is independently

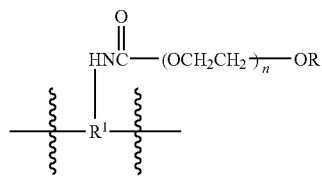

where n is $\geqq 1$ or

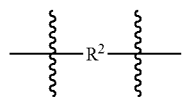

where $R^2$ is aliphatic, cycloaliphatic, or aromatic; and at least one X is:

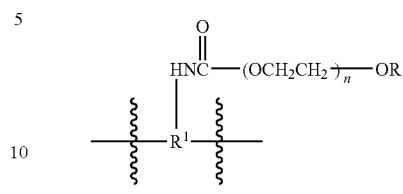

where $R^1$ is:

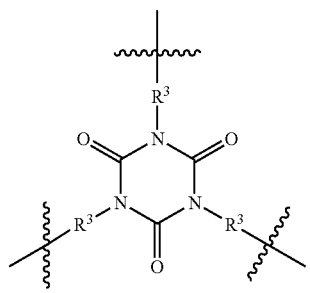

where $R^3$ is aliphatic, cycloaliphatic, or aromatic.

In some embodiments, R includes

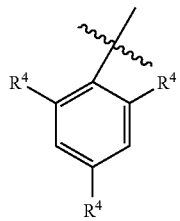

where $R^4$ is an aliphatic group, a cycloaliphatic group, an aromatic group, an arylalkyl group, a heterocyclic group, a heteroatom linkage, or combinations thereof.

In some embodiments, R includes

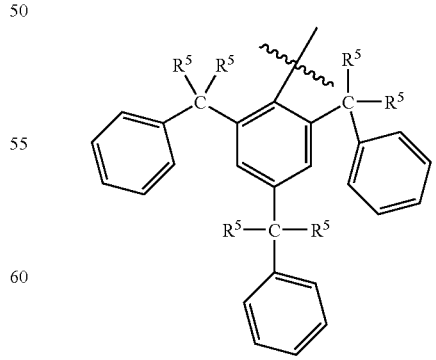

where $R^5$ is hydrogen, alkyl group, butyl, phenyl, benzyl, or combinations thereof.

In some embodiments, R² includes:

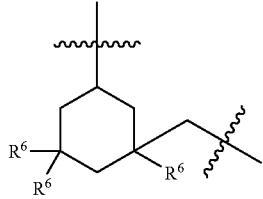

where R⁶ is aliphatic, cycloaliphatic, aromatic, heterocyclic, or combinations thereof. In certain embodiments, R⁶ is methyl.

In some embodiments, the associative thickener is represented by the formula:

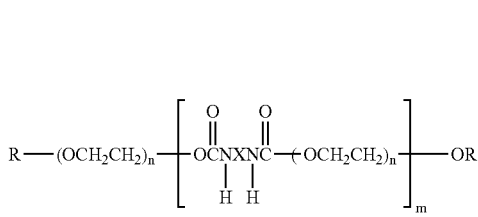

where R is an aromatic hydrophobe; m is $\geq 2$; n is $\geq 1$; and each X is independently

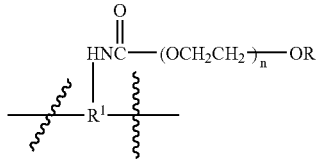

where n is $\geq 1$ or

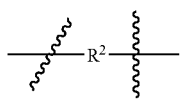

where R² is:

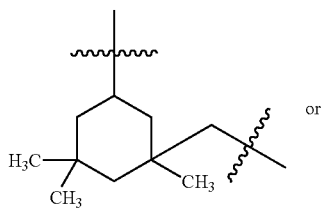

-continued

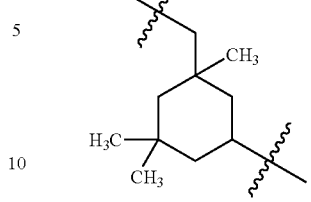

and at least one X is:

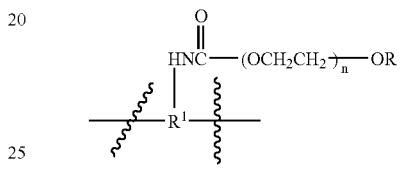

where R¹ is:

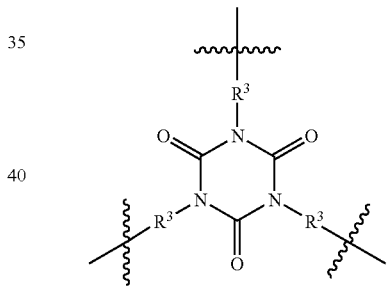

where R³ is $(CH_2)_r$ where r is 0 or 1; and R includes

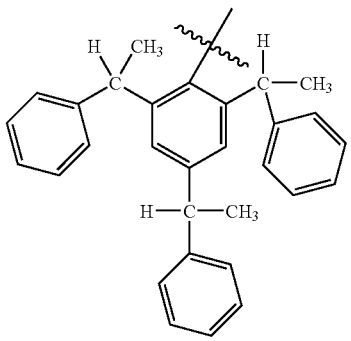

In some embodiments, the associative thickener has the formula:

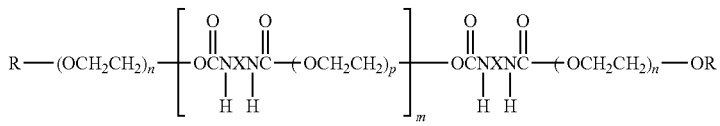

where R is an aromatic hydrophobic portion; m is $\geq 2$; n is $\geq 1$; p ranges from about 45 to about 275; and each X is independently

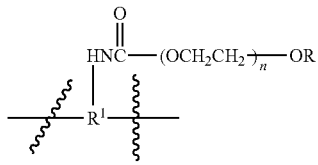

where n is $\geq 1$ or

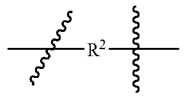

where $R^2$ is aliphatic, cycloaliphatic, or aromatic; and at least one X is:

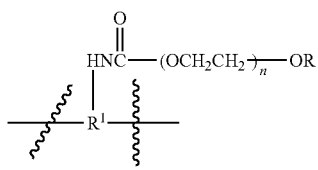

where $R^1$ is:

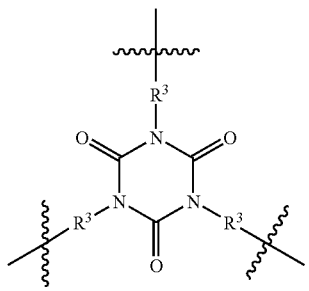

where $R^3$ is aliphatic, cycloaliphatic, or aromatic.

In some embodiments, R includes

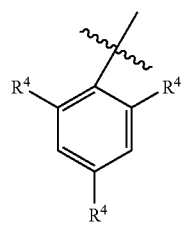

where $R^4$ is an aliphatic group, a cycloaliphatic group, an aromatic group, an arylalkyl group, a heterocyclic group, a heteroatom linkage, or combinations thereof.

In some embodiments, R includes

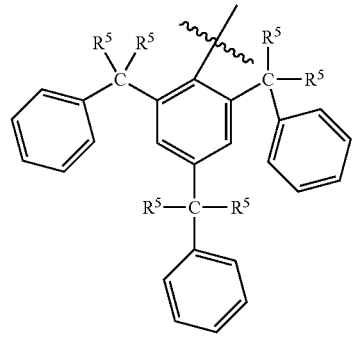

where $R^5$ is hydrogen, alkyl group, butyl, phenyl, benzyl, or combinations thereof.

In some embodiments, $R^2$ includes:

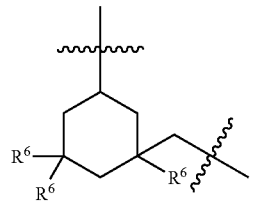

where $R^6$ is aliphatic, cycloaliphatic, aromatic, heterocyclic, or combinations thereof. In certain embodiments, $R^6$ is methyl.

In some embodiments, the associative thickener is represented by the formula:

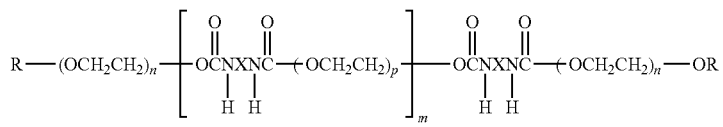

where R is an aromatic hydrophobe; m is ≧2; n is ≧1; p ranges from about 45 to about 275, from about 50 to about 250, or from about 100 to about 200; and each X is independently

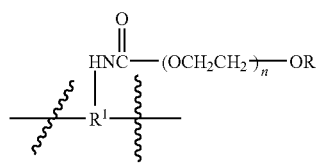

where n is ≧1 or

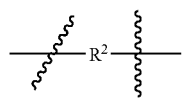

where $R^2$ is:

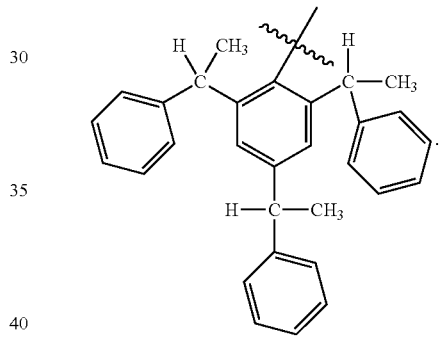

and at least one X is:

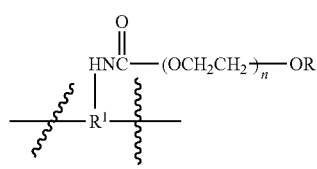

where $R^1$ is:

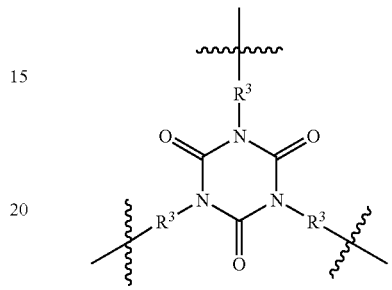

where $R^3$ is $(CH_2)_r$ where r is 0 or 1; and R includes

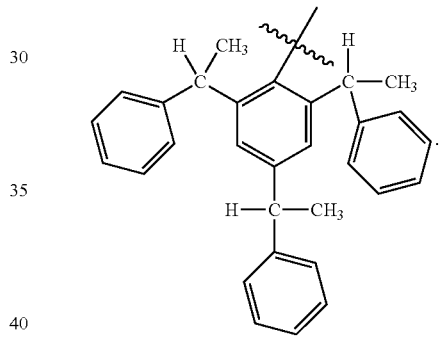

The associative thickener may be prepared according to techniques generally known in the art for preparing urethanes such that substantially all of the isocyanate groups are reacted. In some embodiments, solvent polymerization methods known in the art may be used to prepare the associative thickener. In certain embodiments, melt polymerization methods known in the art may be used to prepare the associative thickener.

The order of reactant charging may not be important. In some embodiments, when the reactants are higher molecular weight or polyfunctional, order of addition may be controlled to avoid gelation. Charging of all compounds may be continuous or semi-continuous. Order of addition, reactant proportions and other conditions of reaction may be varied to control the geometry, molecular weight and other characteristics of the products, in accordance with well-known principles of polyurethane synthesis.

In some embodiments, the associative thickener may be prepared by melting a hydrophilic compound in the presence of a hydrophobic compound under inert conditions (e.g., under a nitrogen atmosphere) at temperatures sufficient to induce melting of the two compounds to form a hydrophilic/hydrophobic melt. During melting, moisture entrained in the hydrophilic and/or hydrophobic compounds may be removed using methods known in the art. Exclusion of moisture from the reaction allows more isocyanate functionality to be available for reaction with hydrophobic compounds. Anhydrous conditions are accomplished by azeotropic distillation to remove water, by heating under a nitrogen sparge, or by prior drying of reactants. In some embodiments, the hydrophilic and/or hydrophobic compounds are sufficiently dry that removal of moisture is not necessary.

After removal of the moisture, a selected amount of isocyanurate trimers followed by a selected amount of di-isocyanate is added to the hydrophilic/hydrophobic melt to form a reaction mixture. In some embodiments, a catalyst may be added to the reaction mixture. Urethane catalysts are described in U.S. Pat. No. 6,343,057 to Blank et al. and U.S. Pat. No. 4,742,909 to Hunter et al., both of which are incorporated herein by reference. In some embodiments, the catalyst may be bismuth carboxylate (King Industries, Norwalk, Conn.). The reaction mixture is allowed to stir for a period of time (for example, 2 hours); after which, the mixture is rolled and shredded.

Reaction temperatures may range from about 25° C. to about 120° C., from about 50° C. to about 100° C., or from about 70° C. to about 90° C. Reaction times may range from about 1 to about 24 hours, from about 2 to about 20 hours or from about 5 to about 15 hours. Reaction temperature and times should be selected to obtain reasonably fast reaction rates while avoiding undesirable side reactions, such as isocyanate-urethane condensation.

In some embodiments, the reaction may be conducted in the presence of an inert solvent, such as xylene, toluene, n-methylpyrrolidone or propylene carbonate.

The amounts of compounds involved and the production method are suitably adapted such that the polyurethane has a theoretical average molecular weight of about 20,000 Daltons to about 60,000 Daltons.

Waterborne coating compositions may include resins, binders, water, pigment compositions, associative thickeners and/or other additives. The associative thickeners described herein may be used in waterborne coating compositions. An amount of associative thickener use in the waterborne composition ranges from about 0.0001 grams to about 0.03 grams, from about 0.0005 grams to about 0.025 grams or from about 0.001 grams to about 0.02 grams per gram of total waterborne coating composition.

Waterborne coating compositions may be made by dispersing, emulsifying or emulsion polymerizing a resin binder in water with surfactants. The resin used in forming the coating may be insoluble in water, and the conversion of such a resin into a waterborne system typically involves converting the resin into an emulsion or dispersion. In some embodiments, resins may include built-in functional groups that confer water "solubility" upon the resin such that external added surfactants are not necessary.

The water insoluble resin may be any of those known in the art and may be a conventional natural or synthetic polymer latex emulsified with one of a nonionic, cationic or anionic surfactant. The primary resins are based on homopolymerized and copolymerized olefinic monomers; homopolymers of $C_2$-$C_{40}$ alpha-olefins; copolymers of ethylene, isobutylene, octene, nonene, or styrene with one or more esters; copolymers of ethylene, isobutylene, octene, nonene, or styrene with nitriles or amides of acrylic acid; copolymers of ethylene, isobutylene, octene, nonene, or styrene with methacrylic acid; copolymers of ethylene, isobutylene, octene, nonene, or styrene with vinyl esters; copolymers of ethylene, isobutylene, octene, nonene, or styrene with vinylidene chloride; copolymers of ethylene, isobutylene, octene, nonene, or styrene with diene polymers, or mixtures thereof.

Examples of homopolymerized and copolymerized olefinic monomers include, but are not limited to, vinyl acetate, vinyl chloride, styrene, butadiene, vinylidene chloride, acrylonitrile, methacrylonitrile, acrylic acid, methacrylic acid, alkyl acrylates, alkyl methacrylates, acrylamide, methacrylamide, hydroxyethyl methacrylate (HEMA), glycidyl methacrylate, dihydroxypropyl methacrylate, vinyl acetate/butyl acrylate/2-ethylhexyl acrylate, vinyl acetate/butyl maleate, vinyl acetate/ethylene, vinyl acetate/vinyl chloride/butyl acrylate and vinyl acetate/vinyl chloride/ethylene, or mixtures thereof.

Examples of homopolymers of $C_2$-$C_{40}$ alpha-olefins include, but are not limited to, ethylene, isobutylene, octene, nonene, styrene or mixtures thereof. Examples of diene polymers include, but are not limited to, copolymers of butadiene with one or more of styrene, vinyl toluene, acrylonitrile, methacrylonitrile, and esters of acrylic acid or methacrylic acid, or mixtures thereof.

In some embodiments, at least 0.001, at least 0.005 or at least 0.05 grams of an acid monomer in the monomer mixture used for making the copolymers described herein may be included when the resin is prepared using emulsion polymerization methods. Acid monomers include, but are not limited to, acrylic acid, methacrylic acid, itaconic acid, crotonic acid, maleic acid, fumaric acid, or mixtures thereof.

A waterborne coating composition may include one or more pigments and/or one or more pigment compositions. Pigment compositions may include white opacifying pigments and/or colored pigments. Colored pigments include organic pigments and inorganic pigments. An amount of pigment compositions to be added to the base composition ranges from about 2 oz per gal to about 16 oz per gal, from about 4 oz per gal to about 12 oz per gal, or from about 6 oz per gal to about 10 oz per gal (from about 59 mL to 473 mL per 3.78 L, from about 188 mL to about 354 mL per 3.78 L, or from about 177 mL to about 295 mL per 3.78 L). The pigment compositions may be added to the waterborne coating composition prior to application.

White opacifying pigments include, but are not limited to, rutile and anatase titanium dioxides, lithopone, zinc sulfide, lead titanate, antimony oxide, zirconium oxide, barium sulfide, white lead, zinc oxide, leaded zinc oxide, and the like, and mixtures thereof. In some embodiments, an average particle size of the opacifying pigments ranges between about 0.2 to about 0.4 microns.

Black pigments include, but are not limited to, various carbon blacks (Pigment Black 7), channel blacks, furnace blacks, lampblacks, or mixtures thereof. Carbon blacks are available from Cabot Corporation (Boston, Mass., USA) under the names Regal®, Black Pearls®, Elftex®, Monarch®, Mogul®, and Vulcan®; from Evonik Industries under the names Printex, Special Black, and/or FW200; from Columbian Chemicals Corporation (Marietta, Ga., USA) under the name Raven; or from Mitsubishi Chemical Corporation (Japan) under the name MA.

The pigment may also be chosen from a wide range of conventional colored pigments. The colored pigment can be blue, black, brown, cyan, green, white, violet, magenta, red, orange, yellow, or mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include, but are not limited to, copper phthalocyanine blue and derivatives thereof (Pigment Blue 15). Examples of quinacridones include, but are not limited to, Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include, but are not limited to, Pigment Red 43, Pigment Red 194 (Perinone Red), Pigment Red 216 (Brominated Pyranthrone Red) and Pigment Red 226 (Pyranthrone Red). Examples of perylenes include, but are not limited to, Pigment Red 123 (Vennillion), Pigment Red 149 (Scarlet), Pigment Red 179 (Maroon), Pigment Red 190 (Red), Pigment Violet 19, Pigment Red 189 (Yellow Shade Red) and Pigment Red 224. Examples of thioindigoids include, but are not limited to, Pigment Red 86, Pigment Red 87, Pigment Red 88, Pigment Red 181, Pigment Red 198, Pigment Violet 36, and Pigment Violet 38. Examples of heterocyclic yellows include, but are not limited to, Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake from a number of sources including BASF Corporation (Germany) and Sun Chemical Corporation (Carlstadt, N.J., USA). Examples of other suitable colored pigments are described in the Colour Index, 3rd edition (The Society of Dyers and Colourists, 1982).

Other examples of pigments include, but are not limited to, Hostafine® series, such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), Normandy Magenta RD-2400, Paliogen Violet 5100, Paliogen® Violet 5890, Permanent Violet VT2645, Heliogen Green L8730, Argyle Green XP-111-S, Brilliant Green Toner GR 0991, Heliogen® Blue L6900, L7020, Heliogen® Blue D6840, D7080, Sudan Blue OS, PV Fast Blue B2GO1, Irgalite Blue BCA, Paliogen® Blue 6470, Sudan III, Sudan II, Sudan IV, Sudan Orange G, Sudan Orange 220, Paliogen® Orange 3040, Ortho Orange OR 2673, Paliogen® Yellow 152, 1560, Lithol Fast Yellow 0991K, Paliotol Yellow 1840, Novoperm® Yellow FG 1, Permanent Yellow YE 0305, Lumogen Yellow D0790, Suco-Gelb L1250, Suco-Yellow D1355, Hostaperm® Pink E, Fanal Pink D4830, Cinquasia Magenta, Lithol Scarlet D3700, Toluidine Red, Scarlet for Thermoplast NSD PS PA, E.D. Toluidine Red, Lithol Rubine Toner, Lithol Scarlet 4440, Bon Red C, Royal Brilliant Red RD-8192, Oracet Pink RF, Paliogen® Red 3871K, Paliogen® Red 3340, and Lithol Fast Scarlet L4300. These pigments are available from sources such as BASF, Celanese Corporation (Dallas, Tex., USA), Claliant (Germany), and European Colour PLC (United Kingdom).

In some embodiments, a waterborne coating composition is paint. Paint may be prepared by mixing a base composition with one or more pigment compositions. A base composition may include, but not limited to, water, polyglycol, a latex resin, dispersant, antifoamant, a preservative, one or more opacifying pigments, a binder, a coalescing agent and an associative thickener of the invention.

An amount of associative thickener in the paint may range from about 0.0001 grams to about 0.03 grams, from about 0.001 grams to about 0.005 grams, or from about 0.01 grams to about 0.02 grams of associative thickener per gram of total paint. The final weight of the composition includes the weight of the pigment composition to be added.

The order of mixing the ingredients is done using mixology methods known in the paint industry. For example, a grind solution and a let down solution may be prepared. The grind solution may include water, propylene glycol, cellulosic thickener, dispersants, antifoamant, preservative, and $TiO_2$. The grind solution may be mixed and ground to disperse the $TiO_2$ in the solution. The let down solution may include resin, an opaque polymer, a coalescing compound, associative thickener, and/or an antifoamant. The let down solution may be added to the grind solution to form a neutral colored paint solution. A pigment and/or pigment composition may be added to the neutral colored paint solution (base composition) prior to painting and/or at the point of sale of the paint.

One or more pigment compositions may be added to the base composition to impart color to the paint. An amount of pigment compositions may range from about 0.5 ounces to about 16 ounces, from about 1 ounce to about 10 ounces or from about 2 ounces to 12 ounces per gallon of final paint composition (15 mL to 473 mL, 29.5 mL to about 295 mL, or about 59 mL to 355 mL per 3.78 L). Stormer viscosity of the final paint composition maybe between about 70% and about 120%, about 80% to about 108%, or from about 90% to about 100% of the Stormer viscosity of the base composition.

The associative thickener described herein may also be used for improving the viscosity stability of other aqueous systems that do not contain a latex such as cosmetics, hair dyes, aqueous-based cutting oils, drilling fluids, packer fluids, cleaners, liquid detergents and fabric softeners, pesticide and agricultural compositions, personal care products (including shampoos, hair conditioners, hand lotions, hand creams, astringents, depilatories, and antiperspirants) and pharmaceutical formulations (including topical creams and hormone patches).

EXAMPLES

Non-limiting examples of associative thickeners described herein and uses thereof are described.

Example 1

Preparation of an Associative Thickener

PEG 8000 (650 grams, 0.0788 moles, Carbowax® 8000, Dow Chemical, Midland, Mich.) and Soprophor BSU (175.13 grams, 0.1576 moles Rhodia-Novecare) were heated to 100° C. in a reaction vessel under a flow of nitrogen until the PEG 8000/Soprophor BSU mixture began to melt. During melting, the PEG 8000/Soprophor BSU was stirred and a vacuum was applied to the reaction vessel to remove any residual water in the PEG 8000/Soprophor BSU melt. The PEG 8000/Soprophor BSU melt was held at 100° C. and a pressure of 2 mm of Hg until no water vapor was observed. After the removal of water, the vacuum was terminated. Under a nitrogen atmosphere, Vestanat® 1890/100 (52.96 grams, 0.0792 moles, Evonik) followed by isophorone di-isocyanate (8.67 grams, 0.039 moles, Evonik) was added to the PEG 8000/Soprophor BSU melt. KKAT-348 (0.8 grams, King Industries, Norwalk Conn.) was added to the reaction vessel to catalyze the reaction. The reaction mixture was heated at 100° C. for 2 hours until polymerization was complete. The resulting hot associative thickener was removed from the reaction vessel and rolled into a sheet using a roller mill. The sheet was shredded using a commercial paper shredder. FIG. 2 schematically depicts the resulting polymeric associative thickener with a 1:2 ratio of di-isocyanate to isocyanurate trimer. Hydrophobes 104, 104', 104", 104''' couple to isophorone di-isocyanate 106 and isocyanurate trimers 108, 108'. Hydrophilic groups 102, 102' couple isophorone di-isocyanate 106 to isocyanurate trimers 108, 108'.

Example 2

Preparation of an Associative Thickener

The same procedure as described in Example 1 was followed with the following ingredients and amounts.

| Reagent | Concentration (moles) |
| --- | --- |
| PEG 8000 | 0.0788 |
| Soprophor BSU | 0.197 |
| Vestanat ® 1890/100 | 0.117 |

FIG. 3 schematically depicts the resulting polymeric associative thickener with multiple isocyanurate trimer portions. Hydrophobes 104, 104', 104", 104''', 104'''' couple to isocyanurate trimers 108, 108'. Hydrophilic groups 102, 102' couple isocyanurate trimer 108' to isocyanurate trimers 108, 108".

Example 3

Preparation of an Associative Thickener

The same procedure as described in Example 1 was followed except that Vestanat® 1890/100 and isophorone di-isocyanate were used.

| Reagent | Concentration (moles) |
| --- | --- |
| PEG 8000 | 0.0788 |
| Soprophor BSU | 0.1576 |
| isophorone di-isocyanate | 0.0792 |
| Vestanat ® 1890/100 | 0.039 |

FIG. 1 schematically depicts the resulting polymeric associative thickener with a 2:1 ratio of di-isocyanate to isocyanurate trimer. Hydrophobes 104, 104', 104" (Soprophor BSU) are coupled to isophorone di-isocyanates 106, 106' and isocyanurate trimer 108. Hydrophilic groups 102, 102' (PEG) couple isophorone di-isocyanates 106, 106' to isocyanurate trimer 108.

Examples 1-3 demonstrate methods of associative thickeners described herein and compositions of such associative thickeners.

Procedure for Making and Testing Latex Paint Using Associative Thickeners of Examples 1-3

Paint was prepared by forming a pigment grind solution, a thickener solution, and a pre-mix solution. The solutions were mixed in the order given. Mixing techniques and equipment are conventional.

Grind Stage

| Component | Supplier | Grams per 2.0 Gallons | Pounds | Gallons |
| --- | --- | --- | --- | --- |
| Water | | 735.78 | 79.98 | 9.6 |
| Propylene Glycol | Dow Chemical | 598.00 | 65.00 | 7.51 |

-continued

| Component | Supplier | Grams per 2.0 Gallons | Pounds | Gallons |
| --- | --- | --- | --- | --- |
| Natrosol ® 250 MHBR (hydroxyethylcellulose) | Aqualon | 18.40 | 2.0 | 0.17 |
| TAMOL 731 (dispersant) | Rohm & Haas | 46.00 | 5.0 | 0.54 |
| Foamaster VL (antifoamant) | Cognis | 9.20 | 1.0 | 0.13 |
| Kathon LX (preservative) | Rohm & Haas | 16.56 | 1.8 | 0.22 |

Let Down

| Component | Supplier | Grams per 2.0 Gallons | Pounds | Gallons |
| --- | --- | --- | --- | --- |
| Water | | 809.6 | 88 | 10.56 |
| Rhoplex SG-10 (acrylic binder) | Rohm & Haas | 4282.88 | 465.5 | 52.78 |
| Ropaque ® OP-62 (Opacifiying polymer) | Rohm & Haas | 257.23 | 27.96 | 3.25 |
| TEXANOL (coalescent) | Eastman Chemical | 223.74 | 24.32 | 3.07 |

Mix the let down components together at low speed for 30 minutes. Remove the mixture from the mixer and divide into pints.

Pre-Mix Comparative Example 1

| Component | Supplier | Pounds | Gallons |
| --- | --- | --- | --- |
| Water | | 72.20 | 8.67 |
| OPTIFLO ®-TVS (nonionic associative thickener) | Southern Clay Products, Inc. | 4.0 | 0.46 |
| OPTIFLO ®-L-100 (nonionic associative thickener) | Southern Clay Products, Inc. | 25.00 | 2.8 |
| Foamaster VL (antifoamant) | Cognis | 1.0 | 0.13 |

Pre-Mix Comparative Example 2

| Component | Supplier | Pounds | Gallons |
| --- | --- | --- | --- |
| Water | | 72.20 | 8.67 |
| Acrylsol ™ RM-825 (nonionic urethane based associative thickener) | Rohm and Haas | 3.04 | 0.35 |

| Component | Supplier | Pounds | Gallons |
|---|---|---|---|
| OPTIFLO ®-L-100 (nonionic associative thickener) | Southern Clay Products, Inc. | 25.00 | 2.8 |
| Foamaster VL (antifoamant) | Cognis | 1.0 | 0.13 |

Premix With Associative Thickener from Example 1

| Component | Supplier | Pounds | Gallons |
|---|---|---|---|
| Water | | 72.20 | 8.67 |
| Associative Thickener | Example 1 | 25.00 | 2.89 |
| Foamaster VL (antifoamant) | Cognis | 1.0 | 0.13 |

Premix With Associative Thickener from Example 2

| Component | Supplier | Pounds | Gallons |
|---|---|---|---|
| Water | | 72.20 | 8.67 |
| Associative Thickener | Example 2 | 25.00 | 2.89 |
| Foamaster VL (antifoamant) | Cognis | 1.0 | 0.13 |

Premix With Associative Thickener from Example 3

| Component | Supplier | Pounds | Gallons |
|---|---|---|---|
| Water | | 72.20 | 8.67 |
| Associative Thickener | Example 3 | 25.00 | 2.89 |
| Foamaster VL (antifoamant) | Cognis | 1.0 | 0.13 |

The pre-mix solutions were added to the pints of paint formulation and mixed using a mechanical stirrer for 20 minutes. Brookfield (cps); Stormer (KU) viscosities were measured after 1 hour and after 24 hours. Gloss, Sag, and Leveling are measured after 24 hours.

After 24 hours red or black pigments (12 ounces, 355 mL) were added to the paint formulation in the following order: half the total amount of the pigment into the bottom of a pint can, half the amount of the paint, other half of the colorant, and then the rest of the paint formulation. The solutions were sealed, turned a couple of times and then shaken on a shaker for 15 minutes. Samples (20 mL) were removed via syringe, and transferred into clear vials. The samples were placed in a 50° C. oven, to perform a heat stability test. The rest of the paint was left at ambient temperature. After 24 hours Brookfield (cps) viscosity, Stormer (KU) viscosity, Gloss, Sag and Level (after tinting) of the heated and ambient paint samples were measured. The measurements are tabulated in TABLES 1-4.

TABLE 1

| | Viscosity Before Tinting | | | Viscosity After Tinting with Black Colorant | | |
|---|---|---|---|---|---|---|
| Sample | Brookfield (cps) | Stormer (KU) | ICI | Brookfield (cps) | Stormer (KU) | ICI (poise) |
| Comp. 1 | 98,000 | 95.0 | 0.5 | 56,000 | 95.0 | 0.38 |
| Comp. 2 | 73,000 | 102.3 | 0.58 | 15,200 | 70.5 | 0.32 |
| Example 1 | 107,500 | 101.0 | 0.5 | 22,560 | 79.3 | 0.32 |
| Example 2 | 79,000 | 85.0 | 0.40 | 37,600 | 78.4 | 0.32 |
| Example 3 | 87,500 | 90.0 | 0.40 | 46,000 | 86.4 | 0.32 |

TABLE 2

| | Before Tinting | | | | After Tinting with Black Colorant | | | |
|---|---|---|---|---|---|---|---|---|
| | | | GLOSS @ | | | | GLOSS @ | |
| Sample | SAG | LEVEL | 60° C. | 85° C. | SAG | LEVEL | 60° C. | 85° C. |
| Comp. 1 | 20 | 2 | 3.6 | 31 | 19 | 3 | 4.8 | 44.6 |
| Comp. 2 | 30 | 3 | 4.3 | 36.0 | 10 | 7 | 3.7 | 47.0 |
| Ex. 1 | 45 | 1 | 4.5 | 55.0 | 15 | 2 | 5.1 | 49.9 |
| Ex. 2 | 38 | 5 | 6.6 | 65.0 | 18.5 | 7 | 6.0 | 53.0 |
| Ex. 3 | 38 | 2 | 4.2 | 46.0 | 19 | 2 | 6.6 | 57.6 |

TABLE 3

| | Viscosity Before Tinting | | | Viscosity After Tinting with Red Colorant | | |
|---|---|---|---|---|---|---|
| Sample | Brookfield (cps) | Stormer (KU) | ICI | Brookfield (cps) | Stormer (KU) | ICI (poise) |
| Comp. 1 | 98,000 | 95.0 | 0.5 | 100,800 | 98.2 | 0.45 |
| Comp. 2 | 73,000 | 102.3 | 0.58 | 24,640 | 76.8 | 0.4 |
| Ex 1 | 107,500 | 101.0 | 0.5 | 48,000 | 90.4 | 0.4 |
| Ex. 2 | 79,000 | 85.0 | 0.40 | 79,800 | 85.6 | 0.35 |
| Ex. 3 | 87,500 | 90.0 | 0.40 | 91,000 | 93.2 | 0.4 |

TABLE 4

| | Before Tinting | | | | After Tinting with Red Colorant | | | |
|---|---|---|---|---|---|---|---|---|
| | | | GLOSS @ | | | | GLOSS @ | |
| Sample | SAG | LEVEL | 60° C. | 85° C. | SAG | LEVEL | 60° C. | 85° C. |
| Comp. 1 | 20 | 2 | 3.6 | 31 | 22 | 1 | 3.1 | 36.3 |
| Comp. 2 | 30 | 3 | 4.3 | 36.0 | 12 | 3 | 5.0 | 42.8 |
| Ex. 1 | 45 | 1 | 4.5 | 55.0 | 20 | 1 | 9.5 | 56.9 |
| Ex. 2 | 38 | 5 | 6.6 | 65.0 | 25 | 1 | 9.2 | 58.2 |
| Ex. 3 | 38 | 2 | 4.2 | 46.0 | 28 | 1 | 7.6 | 55.8 |

Examples 1-3 demonstrate waterborne that includes water, one or more pigment compositions and an associative thickener described herein.

Figure 6:
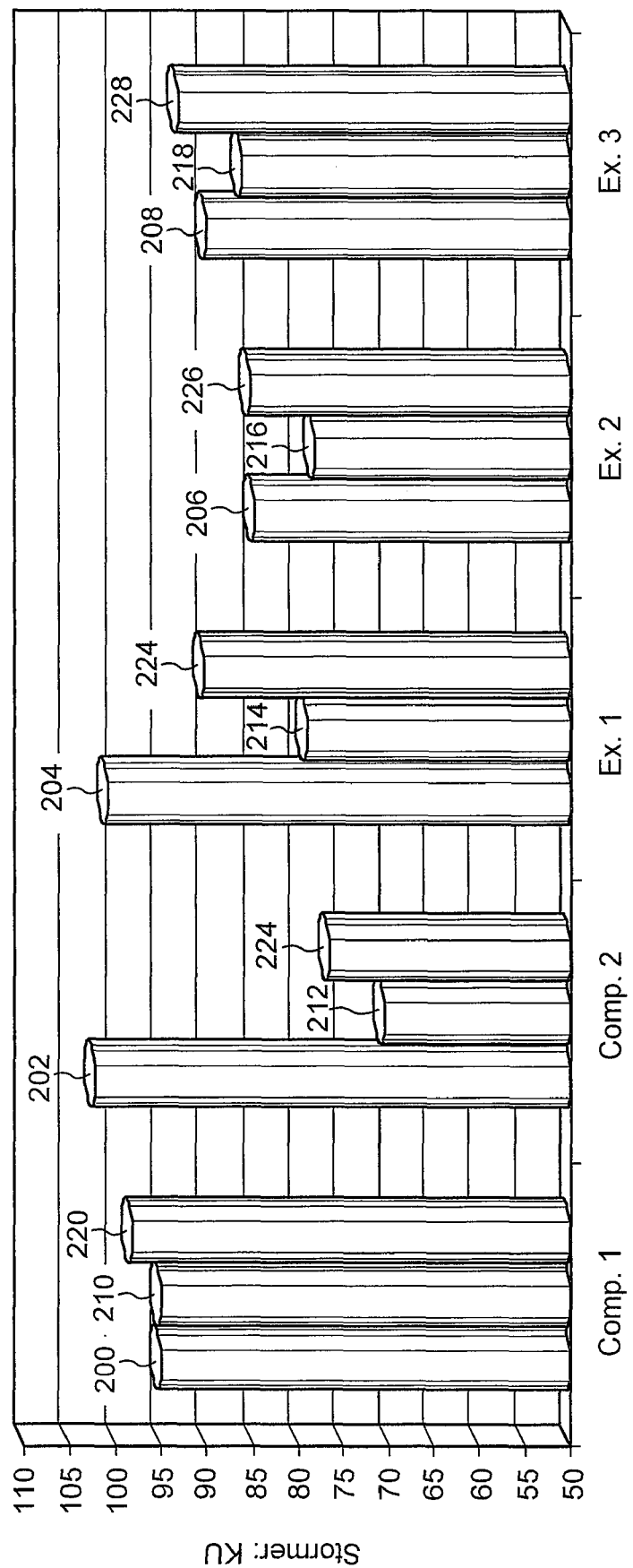
FIG. 6 depicts a graphical representation of Stormer viscosities of various compositions before and after addition of pigment to the compositions.

FIG. 6 depicts a graphical representation of the change in Stormer Viscosity for pre-mix compositions and pre-mix compositions with the addition of black or red pigment for Comparative Examples 1, 2 and Examples 1-3. Bars 200, 202, 204, 206 and 208 represent Stormer viscosity of pre-mix samples for Comparative Example 1, Comparative Example 2, Examples 1, Example 2, and Example 3, respectively. Bars 210, 212, 214, 216, and 218 represent Stormer Viscosity after the addition of black pigment to the pre-mix for Comparative Example 1, Comparative Example 2, Examples 1, Example 2, and Example 3, respectively. Bars 220, 222, 224, 226, and 228 represent Stormer Viscosity after the addition of red pigment to the pre-mix for Comparative Example 1, Comparative Example 2, Examples 1, Example 2, and Example 3, respectively.

Figure 7:
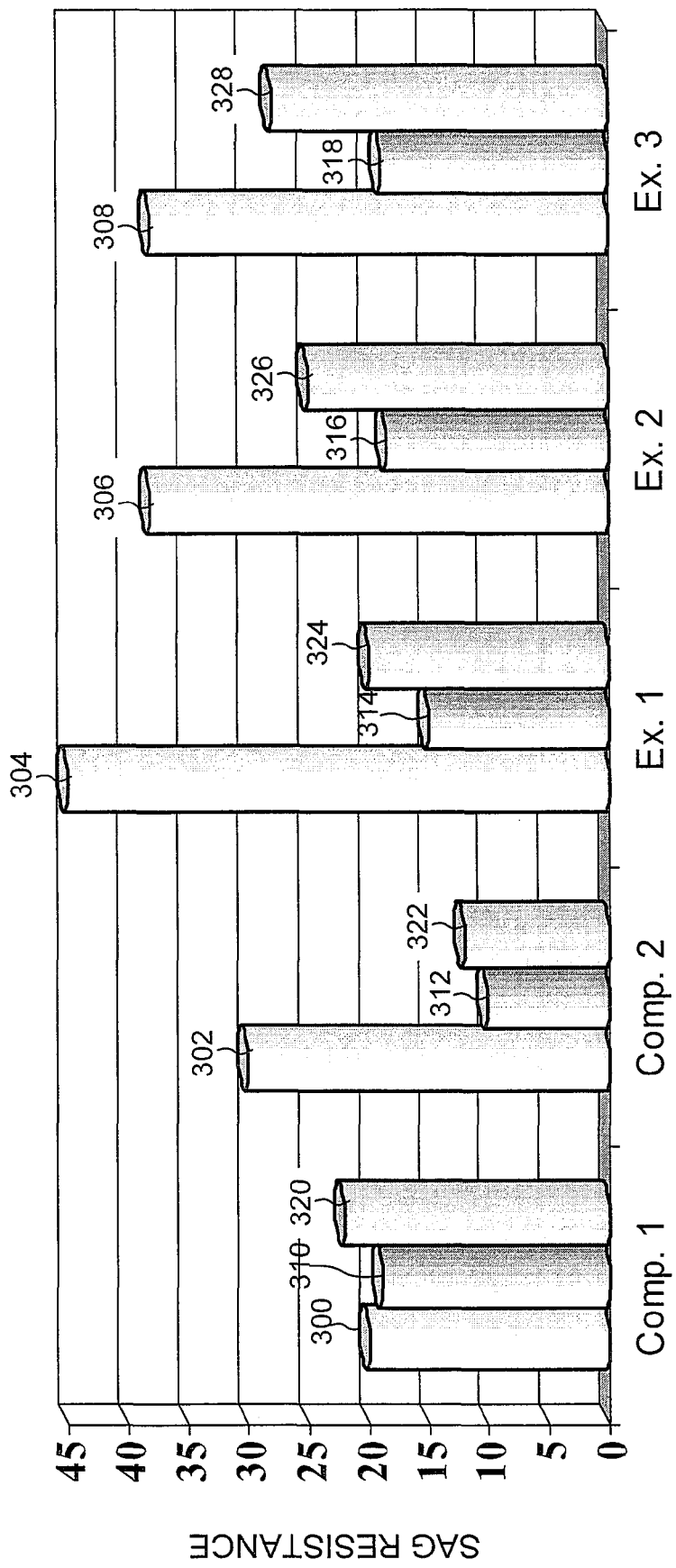
FIG. 7 depicts a graphical representation of SAG resistance of various compositions before and after addition of pigment to the compositions.

FIG. 7 is a graphical representation of the change in SAG resistance for pre-mix compositions and pre-mix compositions with the addition of black or red pigment for Comparative Examples 1, 2 and Examples 1-3. Bars 300, 302, 304, 306, and 308 represent SAG Resistance of pre-mix samples for Comparative Example 1, Comparative Example 2, Examples 1, Example 2, and Example 3, respectively. Bars 310, 312, 314, 316 and 318 represent SAG Resistance after the addition of black pigment to the pre-mix for Comparative Example 1, Comparative Example 2, Examples 1, Example 2, and Example 3, respectively. Bars 320, 322, 324, 326, and 328 represent SAG Resistance after the addition of red pigment to the pre-mix for Comparative Example 1, Comparative Example 2, Examples 1, Example 2, and Example 3, respectively.

As shown in TABLES 1-4 and FIGS. 6 and 7, waterborne coating compositions made with the associative thickeners described herein had improved properties such as SAG, Level, Gloss, and viscosity retention as compared to the commercially available urethane associative thickener.

In this patent, certain U.S. patents and patent applications have been incorporated by reference. The text of such U.S. patents and patent applications is, however, only incorporated by reference to the extent that no conflict exists between such text and the other statements and drawings set forth herein. In the event of such conflict, then any such conflicting text in such incorporated by reference U.S. patents and patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An associative thickener having a formula of:

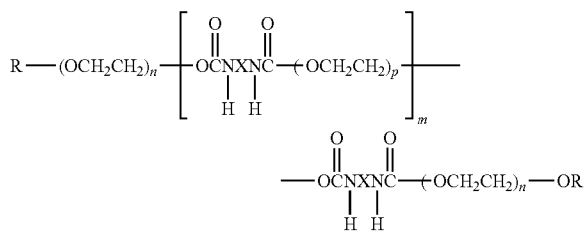

where R is an aromatic hydrophobe; m is ≧2; n is ≧1; p ranges from about 45 to about 275; and each X is independently

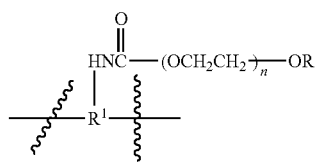

where n is >1; or

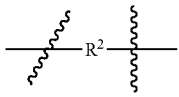

where R² is aliphatic, cycloaliphatic, or aromatic; and at least one X is:

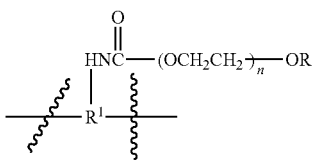

where R¹ is:

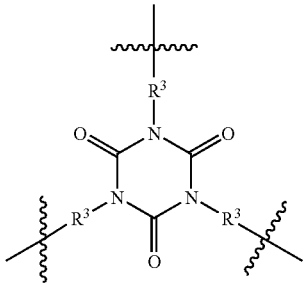

where R³ is aliphatic, cycloaliphatic, or aromatic.

2. The associative thickener of claim 1, wherein R comprises:

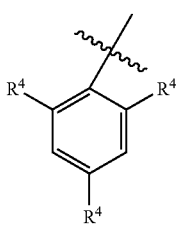

where R⁴ is an aliphatic group, a cycloaliphatic group, an aromatic group, arylalkyl group; a heterocyclic group, a heteroatom linkage, or combinations thereof.

3. The associative thickener of claim 1, wherein R comprises:

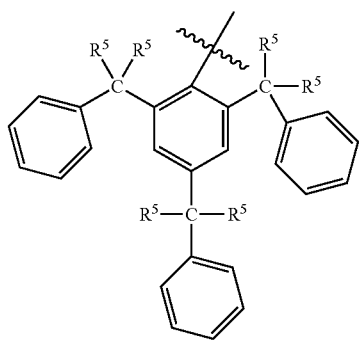

where R⁵ is hydrogen, alkyl group, butyl, phenyl, benzyl, or combinations thereof.

4. The associative thickener of claim 1, wherein R² comprises:

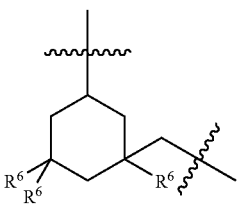

where R⁶ is aliphatic, cycloaliphatic, aromatic, heterocyclic, or combinations thereof.

5. The associative thickener of claim 4, wherein R⁶ is methyl.

6. The associative thickener of claim 1, wherein R is:

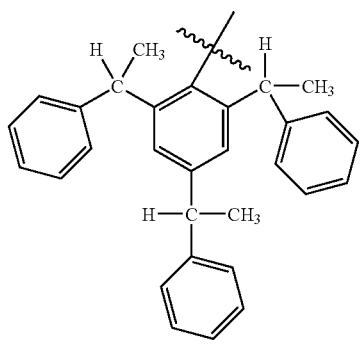

$R^1$ is:

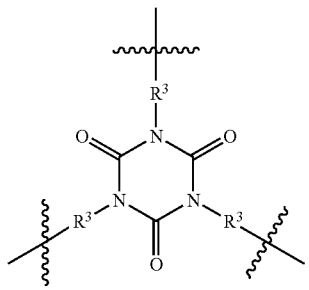

where $R^3$ is $(CH_2)_r$, where r is 0 or 1, and $R^2$ is:

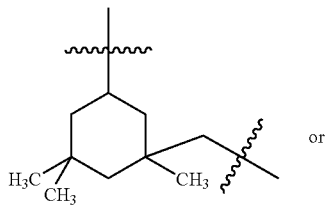 or

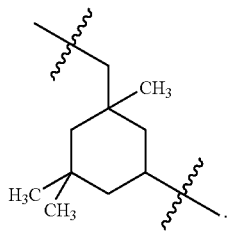

7. An associative thickener made by a method, comprising:
forming a polyether polyol polymer/hydrophobe melt, wherein the hydrophobe comprises an aromatic group;
introducing an isocyanurate trimer and a di-isocyanate to the melt; and
heating the melt at a temperature sufficient to produce an associative thickener having the formula of:

where R is an aromatic hydrophobe; m is $\geq 2$; n is $\geq 1$; p ranges from about 45 to about 275; and
each X is independently

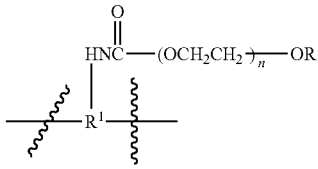

where n is >1; or

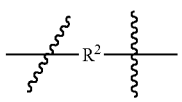

where $R^2$ is aliphatic, cycloaliphatic, or aromatic; and at least one X is

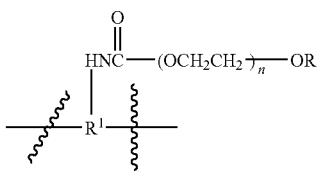

where $R^1$ is

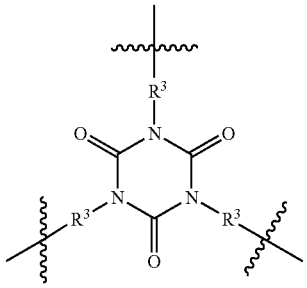

where $R^3$ is aliphatic, cycloaliphatic, or aromatic.

8. A waterborne composition comprising: water, one or more pigment compositions, and an associative thickener having the formula of:

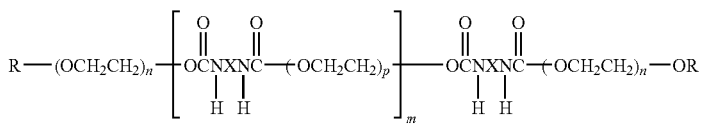

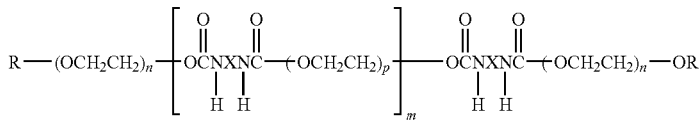

where R is a hydrophobe and comprises an aromatic group; m is ≧2; n is ≧1; p ranges from about 45 to about 275; and each X is independently

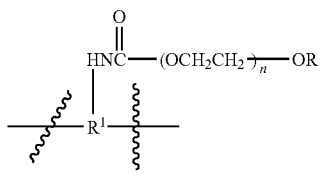

where n is >1; or

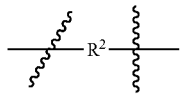

where $R^2$ is aliphatic, cycloaliphatic, or aromatic; and at least one X is:

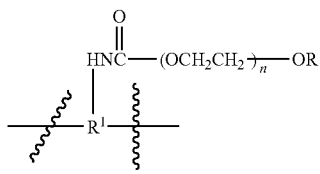

where $R^1$ is:

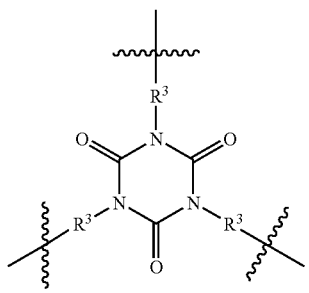

where $R^3$ is aliphatic, cycloaliphatic, or aromatic.

9. The waterborne composition of claim 8, wherein a concentration of associative thickener ranges from about 0.01 wt% to about 3 wt%, based on the total weight of waterborne composition.

10. The waterborne composition of claim 8, wherein a total amount of pigment composition ranges from about 2 ounces to about 16 ounces per gallon of waterborne composition.

11. The waterborne composition of claim 8, wherein the waterborne composition has a SAG resistance value of at least 12 mils, as determined by ASTM Method D4400.

12. The waterborne composition of claim 8, wherein a final Stormer viscosity of the waterborne composition is between about 30% and about 120% of the Stormer viscosity of the waterborne composition prior to addition of one or more of the pigment compositions.

13. The waterborne composition of claim 8, wherein a final Stormer viscosity of the waterborne composition is between about 30% and about 120% of the Stormer viscosity of the waterborne composition prior to addition of one or more of the pigment composition, wherein a total concentration of pigment is at least 2 ounces of pigment composition per gallon of waterborne composition.

14. The waterborne composition of claim 8, wherein a final Stormer viscosity of the waterborne composition is between about 30% and about 120% of the Stormer viscosity of the waterborne composition prior to addition of one or more of the pigment compositions, wherein a total amount of pigment composition ranges from about 2 ounces to about 16 ounces per gallon of waterborne composition, and wherein at least one of the pigment compositions comprises pigment particles having an average particle size of 0.01 micrometers.

15. The waterborne composition of claim 8, wherein at least one of the pigment compositions comprises pigment particles having an average particle size of at least 0.01 micrometers.

16. The waterborne composition of claim 8, wherein at least one of the pigment compositions has a BET surface area of at least 10 m²/g microns as measured by nitrogen adsorption.

17. The waterborne composition of claim 8, wherein at least one of the pigment compositions comprises iron oxide.

18. The waterborne composition of claim 8, wherein at least one of the pigment compositions comprises carbon black.

19. The waterborne composition of claim 8, wherein at least one of the pigment compositions comprises one or more phthalo compounds.

20. The waterborne composition of claim 8, wherein the waterborne composition is paint.

* * * * *